J. HUTTON, Jr.
Street-Car Door Opener.
No. 208,243.  Patented Sept. 24, 1878.
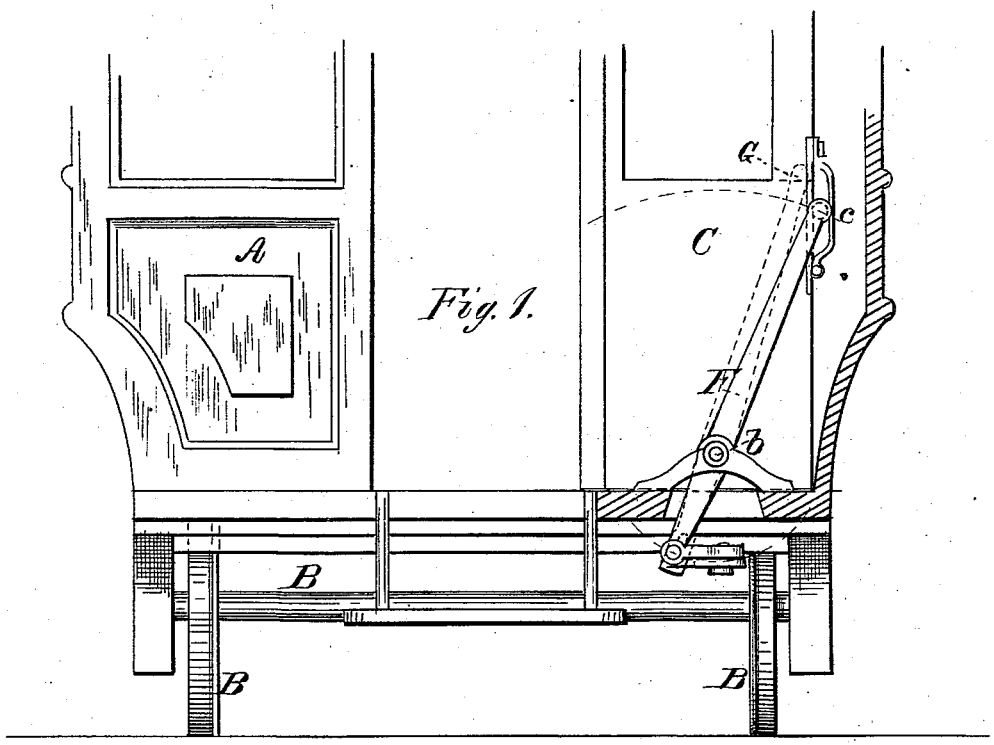
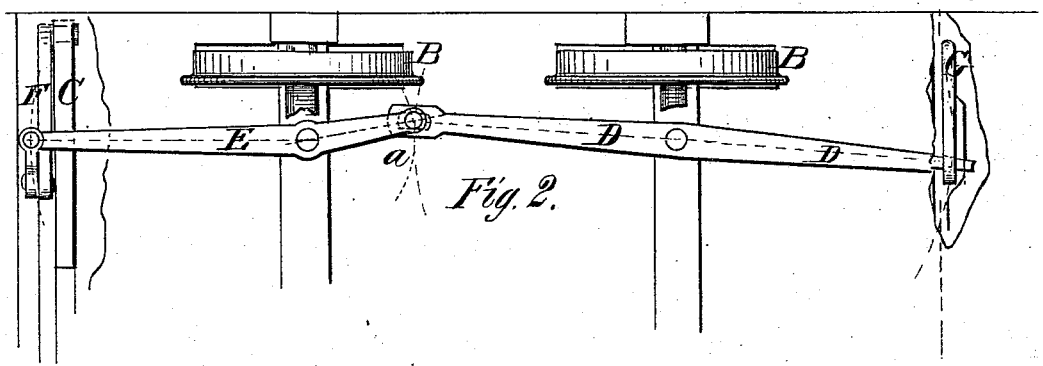
Witnesses.
Alfred Shedlock.
William Shedlock.
Inventor.
John Hutton, Jr.
E. N. Johnson,
Attorney

UNITED STATES PATENT OFFICE.

JOHN HUTTON, JR., OF BROOKLYN, NEW YORK.

IMPROVEMENT IN STREET-CAR-DOOR OPENERS.

Specification forming part of Letters Patent No. 208,243, dated September 24, 1878; application filed April 30, 1878.

*To all whom it may concern:*

Be it known that I, JOHN HUTTON, Jr., of Brooklyn, Kings county, New York, have invented certain Improvements in Street-Car-Door Openers, of which the following is a specification:

Prior to my invention, so far as known to me, the devices employed for operating the rear door of street-cars from the front platform consisted of ropes, or of rock-shafts, passing either through the interior of the car or underneath it, which were provided at one extremity with an arm or lever connected directly to the door, or through the medium of other levers at the rear end of the car, the other extremity of such rock-shafts being provided with an operating-handle, by which the driver opened and closed the door; or the door was operated by levers pivoted under the car at its rear end, and operated by a reciprocating rod connected to the handle or lever at the driver's platform.

The two latter methods may be found in Letters Patent to Thomas Castor, July 2, 1861, No. 1,677, and D. Shield, October 11, 1875, No. 168,791.

My invention is an improvement on such devices; and consists, first, in a street-car-door-operating mechanism consisting of a lever pivoted at the rear of the car, so as to oscillate in a vertical plane, a lever similarly pivoted at the driver's platform, and one or more levers connecting the two directly, pivoted underneath the body of the car, so as to oscillate in a horizontal plane; and it consists, secondly, in a combination and arrangement of levers constituting a street-car-door-operating mechanism, as will be fully hereinafter set forth.

In the drawings, Figure 1 is a rear-end view of a street-car provided with my improved door-operator, and Fig. 2 is a view underneath the car.

A represents the body of the car, B the wheels and axles, and C the door, which is of the ordinary description, sliding between the walls of the car, as usual. Pivoted underneath the car, so as to move in a horizontal plane, are the levers D E, they being connected together by a pin or otherwise at *a*.

The outer extremity of the lever E is connected by a link or otherwise to the lower extremity of a lever, F, pivoted to the body of the car, or to a bracket secured thereto at *b*, so as to move in a vertical plane, as shown. The outer extremity of the lever D takes into a slot cut in the lower extremity of a lever, G, pivoted similarly to the lever F, it being provided with a handle at its upper extremity to be grasped by the driver in operating the door from his platform.

From the foregoing description it will be readily understood that by moving the lever G the lever F will be correspondingly moved through the system of compound leverage D E. The upper extremity of the lever F being connected with the door C by a pin from the lever entering the slot formed by the strip *c*, it will be seen that as the lever is rocked on its pivot the door will be opened and closed.

The strip *c* is hinged at its lower extremity to a plate secured to the edge of the door, as shown, its upper extremity being secured by a screw.

It is obvious that one lever may be used instead of two, or that more than two may be employed. I have found, however, that with the ordinary construction of what are known as "box-cars" the arrangement shown of two levers is best; but I do not confine myself to such arrangement.

I claim—

1. A street-car-door-operating mechanism consisting of a lever, F, pivoted so as to oscillate in a vertical plane, a lever, G, similarly pivoted at the driver's platform, and one or more levers connecting the two directly, pivoted underneath the body of the car, so as to oscillate in a horizontal plane, substantially as described and specified.

2. The combination of the levers F, E, D, and G, pivoted as described, constituting a street-car-door opening and closing mechanism, substantially as described.

JOHN HUTTON, JR.

Witnesses:
E. H. JOHNSON,
WALTER G. HOWEY,